United States Patent
Yamashita et al.

(10) Patent No.: US 10,468,935 B2
(45) Date of Patent: Nov. 5, 2019

(54) MOTOR

(71) Applicant: Nidec Corporation, Kyoto (JP)

(72) Inventors: Yoshiaki Yamashita, Kyoto (JP); Takashi Hattori, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 61 days.

(21) Appl. No.: 15/755,261

(22) PCT Filed: Aug. 23, 2016

(86) PCT No.: PCT/JP2016/074484
§ 371 (c)(1),
(2) Date: Feb. 26, 2018

(87) PCT Pub. No.: WO2017/033917
PCT Pub. Date: Mar. 2, 2017

(65) Prior Publication Data
US 2018/0248440 A1  Aug. 30, 2018

(30) Foreign Application Priority Data
Aug. 27, 2015  (JP) ................. 2015-168376

(51) Int. Cl.
*H02K 5/00*  (2006.01)
*H02K 5/10*  (2006.01)
(Continued)

(52) U.S. Cl.
CPC ............. *H02K 5/10* (2013.01); *H02K 5/22* (2013.01); *H02K 5/225* (2013.01); *H02K 11/33* (2016.01)

(58) Field of Classification Search
CPC ........... H02K 5/225; H02K 5/04; H02K 5/10; H02K 11/33
(Continued)

(56) References Cited

U.S. PATENT DOCUMENTS 8,618,703 B2 * 12/2013 Kinoshita ............... F04B 35/04
   310/71
8,704,417 B2   4/2014 Kamogi
(Continued)

FOREIGN PATENT DOCUMENTS

JP   2001-280501 A   10/2001
JP   2002-345211 A   11/2002
(Continued)

OTHER PUBLICATIONS

Official Communication issued in International Patent Application No. PCT/JP2016/074484, dated Sep. 20, 2016.

*Primary Examiner* — Thanh Lam
(74) *Attorney, Agent, or Firm* — Keating & Bennett, LLP

(57) ABSTRACT

A motor body includes a motor housing accommodating a rotor and a stator, a cover disposed above the motor body, a connector including a connector covering portion disposed between the motor body and the cover, and a substrate electrically connected to the motor body. The motor includes a first sealing portion that seals an upper portion of the motor housing and the connector covering portion, and a second sealing portion disposed on an upper side of the first sealing portion, the second sealing portion sealing is disposed between the cover and the connector covering portion, and the first sealing portion is disposed below an upper end of the motor housing.

9 Claims, 2 Drawing Sheets

(51) Int. Cl.
*H02K 5/22* (2006.01)
*H02K 11/33* (2016.01)

(58) Field of Classification Search
USPC .............................................. 310/64, 71, 89
See application file for complete search history.

(56) References Cited

U.S. PATENT DOCUMENTS

| | | | |
|---|---|---|---|
| 8,970,078 B2* | 3/2015 | Zhang | H02K 5/145 310/239 |
| 9,450,476 B2 | 9/2016 | Ito et al. | |
| 9,455,610 B2 | 9/2016 | Tomizawa et al. | |
| 9,762,102 B2 | 9/2017 | Kanda et al. | |
| 2004/0145259 A1* | 7/2004 | Wysk | H02K 5/10 310/89 |
| 2015/0115755 A1 | 4/2015 | Yamasaki et al. | |
| 2015/0236570 A1* | 8/2015 | Hayashi | H02K 5/10 310/45 |
| 2015/0357886 A1* | 12/2015 | Ishizeki | H02K 11/04 310/71 |
| 2016/0329781 A1* | 11/2016 | Onishi | H02K 5/04 |
| 2017/0201149 A1* | 7/2017 | Haga | H02K 11/21 |
| 2017/0331347 A1 | 11/2017 | Kanda et al. | |

FOREIGN PATENT DOCUMENTS

| | | |
|---|---|---|
| JP | 2014-143897 A | 8/2014 |
| JP | 2014-143898 A | 8/2014 |
| JP | 2014-143899 A | 8/2014 |
| JP | 2014-150709 A | 8/2014 |
| JP | 2014-151850 A | 8/2014 |
| JP | 2014-180170 A | 9/2014 |
| JP | 2015-092803 A | 5/2015 |

* cited by examiner

MOTOR

BACKGROUND OF THE INVENTION

1. Field of the Invention

The present invention relates to a motor.

2. Description of the Related Art

There are motors in which a controller is attached thereto. The controller includes a heat sink and a plate.

In the electric motor described above, there are cases in which a structure for waterproofing is needed at two portions, namely, between the yoke and the heat sink, and between the heat sink and the plate. In many cases, the waterproofing structures at the two portions overlap each other in the axial direction.

In particular, in a case in which such a waterproofing structure is provided in a controller attached to an electric motor, there is a problem in that the miniaturization of the controller is hindered.

SUMMARY OF THE INVENTION

A preferred embodiment of a motor of the present invention is a motor including a motor body that includes a rotor including a shaft extending in an up-down direction about a central axis, a stator including the rotor, and a motor housing that accommodates the stator and the rotor, a cover disposed above the motor body, a connector including a connector covering portion disposed between the motor body and the cover, and a connector portion connected to an external power supply, and a substrate electrically connected to the motor body, the substrate being covered by the cover or the connector and being disposed on an upper side of the motor body, in which the connector covering portion further includes openings on an upper side and a lower side, in which in the openings, the opening on the upper side is closed by the cover, and the opening on the lower side is closed by the motor housing, wherein the motor further includes a first sealing portion that seals an upper portion of the motor housing and the connector covering portion, and a second sealing portion disposed on an upper side of the first sealing portion, the second sealing portion sealing between the cover and the connector covering portion, and wherein the first sealing portion is disposed below an upper end of the motor housing.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
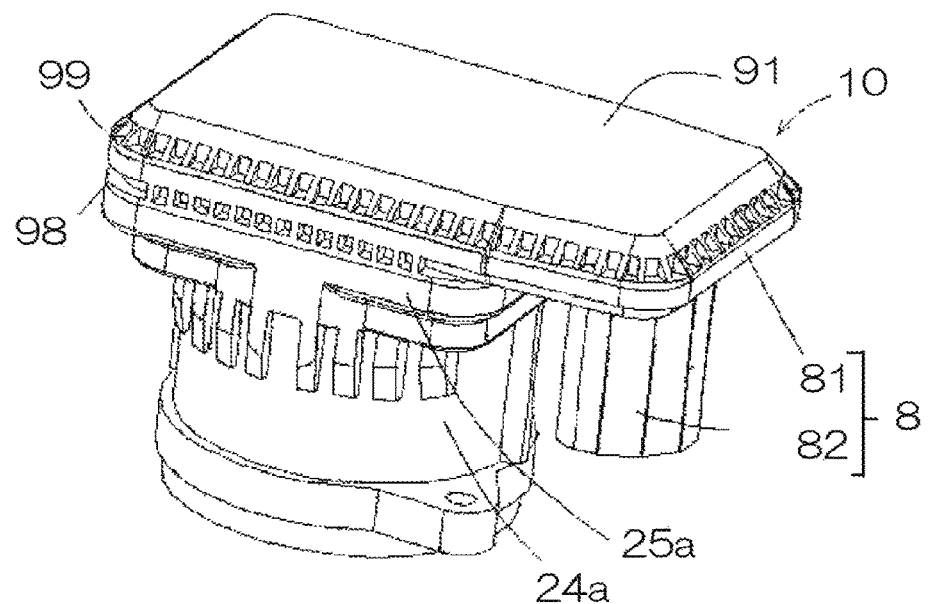
FIG. 1 is a perspective view illustrating a motor of a first preferred embodiment of the present invention.

Hereinafter, referring to the drawings, motors according to preferred embodiments of the present invention will be described. Note that the scope of the present invention is not limited to the preferred embodiments below and can be changed in any manner within the scope of the technical ideas of the present invention. Furthermore, in the drawings hereinafter, the scales, the numbers, and the like may be different from those of the actual structure in order to facilitate understanding of the configurations. Unless otherwise stated, a direction parallel to a central axis J is merely referred to as an "axial direction", a radial direction having the central axis J as the center is merely referred to as a "radial direction", and a circumferential direction about the central axis J, in other words, around the central axis J, is merely referred to as a "circumferential direction".

Figure 2:
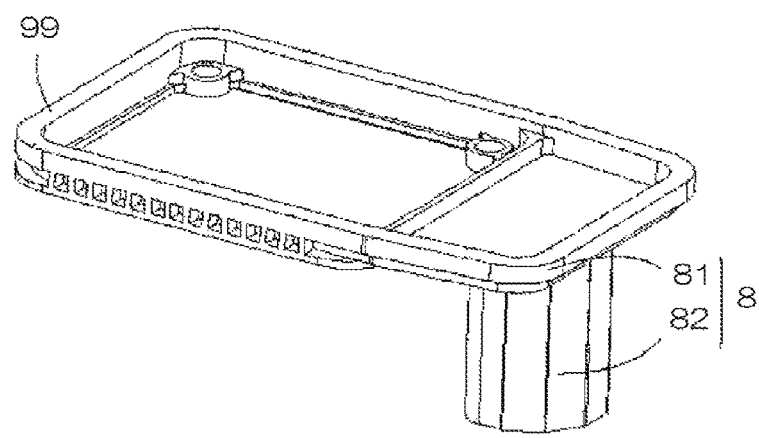
FIG. 2 is a perspective view illustrating a connector of the first preferred embodiment of the present invention.
Figure 3:
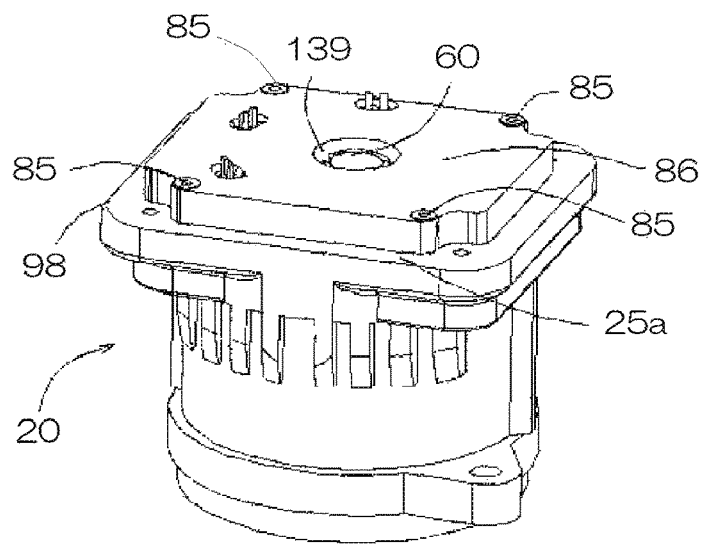
FIG. 3 is a perspective view illustrating a motor body of the first preferred embodiment of the present invention.
Figure 4:
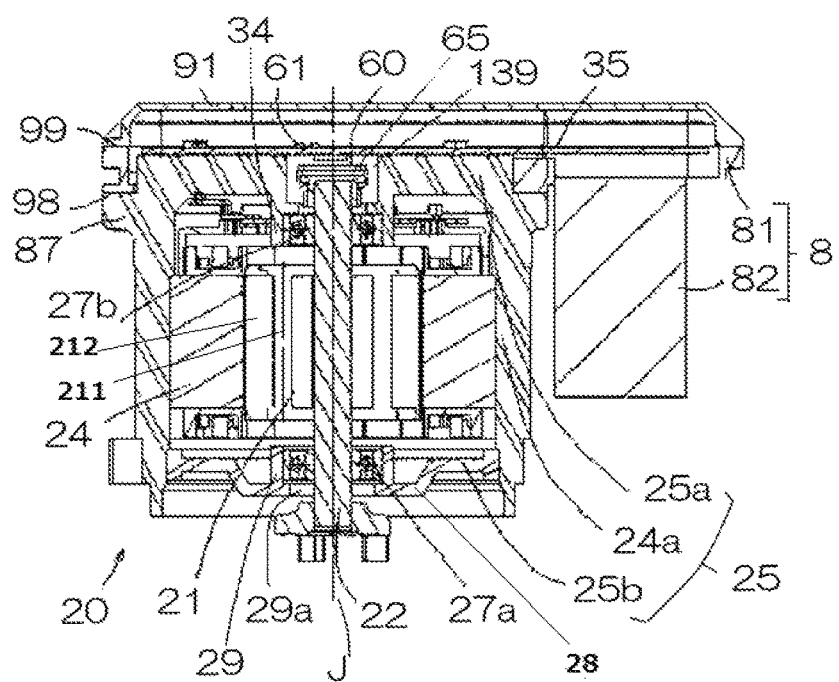
FIG. 4 is a cross-sectional view illustrating the motor of the first preferred embodiment of the present invention.

FIG. 1 is a perspective view illustrating a motor 10 of the present preferred embodiment of the present invention. FIG. 2 is a perspective view illustrating a connector 8. FIG. 3 is a perspective view illustrating a motor body 20. FIG. 4 is a cross-sectional view illustrating the motor 10 of the present preferred embodiment.

In the present preferred embodiment, the motor 10 is preferably a brushless motor, for example. As illustrated in FIGS. 1 and 4, in the present exemplary preferred embodiment, the motor 10 preferably includes the motor body 20, a substrate 35, a sensor magnet 60, a rotation sensor 61, the connector 8, and a cover 91.

As illustrated in FIG. 4, the substrate 35 is disposed on an upper side of the motor body 20. The sensor magnet 60 is fixed to a shaft 22 of the motor body 20. The rotation sensor 61 is attached to the substrate 35. The cover 91 is disposed above the motor body 20. The connector 8 includes a connector covering portion 81 disposed between the motor body 20 and the cover 91. Hereinafter, a detailed description of the components will be given.

The motor body 20 preferably includes a rotor 21 including the shaft 22, a lower bearing 27a, an upper bearing 27b, a stator 24, and a motor housing 25.

The rotor 21 preferably includes the shaft 22, a rotor core 211, and a rotor magnet 212. The central axis J extending in the axial direction serves as a center of the shaft 22. The shaft 22 preferably has a columnar or substantially columnar shape. The shaft 22 is supported in a rotatable manner about the central axis J with the lower bearing 27a and the upper bearing 27b. The motor housing 25 (described later) preferably includes a lower cover portion 25b. The lower cover portion 25b includes an output shaft hole penetrating in the axial direction. An end portion of the shaft 22 on the lower side is exposed to the outside of the motor 10 through the output shaft hole. Note that the shaft 22 may be a hollow member.

In the present preferred embodiment, the rotor core 211 preferably includes stacked steel sheets and is defined by stacking a plurality of electromagnetic steel sheets in the axial direction. The rotor core 211 includes a through hole that penetrates in the axial direction. The shaft 22 is passed through the through hole. In other words, the rotor core 211 surrounds the periphery of the shaft 22. The shaft 22 is fixed to the rotor core 211. The shaft 22 is preferably fixed to the rotor core 211 by press-fitting or the like, for example. An upper end portion of the shaft is positioned above the stator 24 in the axial direction. A lower end portion of the shaft is positioned below the stator 24 in the axial direction. In the present preferred embodiment, the rotor magnet 212 preferably has a cylindrical shape. The rotor magnet 212 is fixed to an outer lateral surface extending about a central axis J of the rotor core 211. When the motor 10 is driven, the rotor core 211 and the rotor magnet 212 rotate integrally with the shaft 22. Note that the shape of the rotor magnet 212 does not necessarily have to be cylindrical. A plurality of rotor magnets 212 may be disposed on the outer lateral surface of the rotor core 211 in the circumferential direction. Furthermore, the rotor core 211 may include a plurality of through holes or recesses in which a longitudinal direction thereof is the axial direction, and the through holes or the recesses may each have a rotor magnet 212 inserted and held therein.

The stator core 24 has a substantially annular shape in plan view. The stator 24 surrounds the rotor 21 about the central axis J. In other words, the stator 24 opposes the rotor 21 in the radial direction with a gap in between. The rotor 21 is disposed inside the stator 24 in the radial direction. When the motor is driven, the stator 24 causes the rotor 21 to rotate about the central axis J. The stator 24 preferably includes a stator core, a plurality of coils (not shown), and a plurality of insulators. More specifically, the stator 24 includes a core back portion, a plurality of tooth portions (not shown), the plurality of coils, and the plurality of insulators.

The stator core preferably includes stacked steel sheets and is defined by stacking a plurality of electromagnetic steel sheets in the axial direction. The stator core preferably includes the core back portion and the tooth portions. The shape of the core back portion is a cylindrical shape that is concentric with the shaft 22. The tooth portions extend from an inner lateral surface of the core back portion towards the shaft 22 (in other words, towards the inside in the radial direction). The plurality of tooth portions are disposed on the inner lateral surface of the core back portion at equal intervals in the circumferential direction.

Each insulator is attached to the corresponding tooth portion. The insulator is preferably made of an insulating material such as a resin, for example. The coils are each preferably formed by winding conducting wire around the corresponding tooth portion with the corresponding insulator interposed therebetween. In other words, the coils are provided in the tooth portions with the insulators interposed therebetween.

The motor housing 25 is a tubular member extending in the axial direction. In the present preferred embodiment, the material of the motor housing 25 is preferably metal. The motor housing 25 holds the stator 24 and the lower bearing 27a. The motor housing 25 preferably includes a tubular portion 24a, the lower cover portion 25b, and an upper cover portion 25a.

The tubular portion 24a is a tubular member that holds the stator 24. In the present preferred embodiment, the tubular portion 24a has a cylindrical or substantially cylindrical shape. An outer lateral surface of the stator 24, in other words, the outer lateral surface of the core back portion is fitted in an inner lateral surface of the tubular portion 24a. With the above, the stator 24 is held in the motor housing 25.

The lower cover portion 25b is preferably a flat plate-shaped member. In the present preferred embodiment, the shape of the lower cover portion 25b is disk-shaped or substantially disk-shaped. More specifically, the lower cover portion 25b includes a substantially disk-shaped plate portion 28, and a tubular lower bearing holding portion 29. The lower cover portion 25b is connected to an end portion of the tubular portion 24a on the lower side, and extends in a direction perpendicular to the central axis J. More specifically, the lower cover portion 25b is a plate-shaped member that spreads out from the central axis J side towards the outside in the radial direction. The lower cover portion 25b is held on the lower side of the inner lateral surface of the tubular portion 24a in the axial direction. As illustrated in FIG. 4, in the present preferred embodiment, the tubular portion 24a and the lower cover portion 25b are provided as separate members. The lower cover portion 25b is fixed to an inner circumferential surface of the tubular portion 24a. The lower cover portion 25b is fixed to the inner lateral surface of the tubular portion 24a by, for example, press-fitting, shrink-fitting, or welding.

The lower cover portion 25b includes the lower bearing holding portion 29. The lower bearing holding portion 29 is a tubular region and extends upwards in the axial direction from the plate portion 28. The lower bearing holding portion 29 is concentric with the central axis J and includes an output shaft hole 29a the penetrating in the axial direction. The lower bearing holding portion 29 holds, on the inside thereof in the radial direction, the lower bearing 27a. In other words, the lower bearing holding portion 29 holds, inside the output shaft hole 29a, the lower bearing 27a. A portion of the shaft 22 is inserted in the output shaft hole 29a. In other words, a lower end portion of the shaft 22 passes the output shaft hole 29a. The end portion of the shaft 22 on the lower side is exposed to the outside of the motor 10 through the output shaft hole 29a. The lower bearing 27a rotatably supports the shaft 22.

The upper cover portion 25a is a plate-shaped member. The upper cover portion 25a is connected to an end portion of the tubular portion 24a on the upper side, and extends in a direction perpendicular to the central axis J. In other words, the upper cover portion 25a is a plate-shaped member that spreads out from the central axis J side towards the outside in the radial direction. In the present preferred embodiment, the tubular portion 24a and the upper cover portion 25a are preferably defined by a single unitary member. Preferably, the tubular portion 24a and the upper cover portion 25a are integrally formed by press working, cutting, casting, or the like.

As described above, the lower bearing 27a is disposed below the stator 24. The lower bearing 27a is preferably held by the lower bearing holding portion 29 of the lower cover portion 25b.

The upper bearing 27b is disposed above the stator 24. In other words, the upper bearing 27b is positioned on an opposite side with respect to the lower bearing 27a in the axial direction. The upper bearing 27b is held by an upper bearing holding portion 34 of the upper cover portion 25a.

The lower bearing 27a and the upper bearing 27b rotatably support the shaft 22 of the rotor 21. In the present preferred embodiment, the lower bearing 27a and the upper bearing 27b are ball bearings, for example. However, the types of the lower bearing 27a and the upper bearing 27b are not limited in particular, and other types of bearings, such as a slide bearing may be used. The type of the lower bearing 27a may be the same as the type of the upper bearing 27b or may be different.

The substrate 35 is preferably disposed on the upper side of the motor body 20. The substrate 35 is fixed to the upper cover portion 25a. Specifically, the upper cover portion 25a includes a plurality of substrate fixing portions 85 on the upper surface. In the present preferred embodiment, the number of substrate fixing portions 85 is preferably four, for example. The substrate fixing portions 85 protrude upwards in the axial direction from the upper surface of the upper cover portion 25a. The substrate 35 is disposed on upper end portions of the substrate fixing portions 85. In the present preferred embodiment, the substrate fixing portions 85 are tubular in which the longitudinal direction is the axial direction. A plurality of through holes penetrating in the axial direction are provided in the substrate 35. The substrate 35 is disposed on the upper end portions of the substrate fixing portions 85. More specifically, the substrate fixing portions 85 are in contact with the surface of the substrate 35 in portions except for the metal wiring portions. The substrate 35 is fixed to the substrate fixing portions 85 by screwing or with an adhesive agent, for example. The upper cover portion 25*a* and the substrate 35 oppose each other in the axial direction with a gap in between. Preferably, an insulating heat radiating member or the like may be disposed between the upper cover portion 25*a* and the substrate 35. Note that outside diameters of the substrate fixing portions 85 may be smaller than inside diameters of the through holes of the substrate 35, and the substrate fixing portions 85 may be inserted in the through holes of the substrate 35.

In the present preferred embodiment, the sensor magnet 60 preferably has an annular shape. In the sensor magnet 60, north poles and south poles are preferably disposed alternately in the circumferential direction. As illustrated in FIG. 4, the sensor magnet 60 is positioned above the stator 24. The sensor magnet 60 is positioned above the upper bearing 27*b*.

The sensor magnet 60 is fixed to the shaft 22 directly or indirectly. In the present preferred embodiment, the sensor magnet 60 is preferably fixed to the shaft 22 indirectly. More specifically, a support member 65 is fixed to the upper end portion of the shaft 22. In other words, the support member 65 is disposed above the upper bearing holding portion 34 in the axial direction. The support member 65 is a member that is concentric with the shaft 22 extending in the axial direction. The sensor magnet 60 is fitted to the support member 65 from the outside in the radial direction. In the present preferred embodiment, the sensor magnet 60 is positioned above the shaft 22. In other words, the support member 65 is a sensor magnet accommodating portion that accommodates the sensor magnet 60.

The rotation sensor 61 is attached to an underside of the substrate 35. In the present preferred embodiment, the rotation sensor 61 is a magnetoresistive element. The rotation sensor 61 opposes the sensor magnet 60 in the axial direction.

As illustrated in FIG. 4, the connector 8 accommodates the substrate 35 therein. The connector 8 includes the connector covering portion 81 and a connector portion 82. In the present preferred embodiment, the connector covering portion and the connector portion are preferably provided by a single member manufactured by injection molding, for example. However, the connector covering portion and the connector portion may be formed of different members.

The connector covering portion 81 is disposed between the motor body 20 and the cover 91 described later. The connector covering portion 81 includes an opening on the upper side and on the lower side. The opening on the upper side is covered by the cover 91 described later. The opening on the lower side is closed by the motor housing 25. More specifically, the opening on the lower side is covered by the upper cover portion 25*a*.

In the present preferred embodiment, the motor 10 includes a first sealing portion 98 that seals between the motor housing 25 and the connector covering portion 81.

The connector portion 82 is disposed outside of the tubular portion 24*a* in the radial direction and extends towards the lower side. The connector portion 82 is connected to an external power supply (not shown).

The cover 91 preferably covers an upper side of the connector 8. The material of the cover 91 is resin, for example. In the present preferred embodiment, the motor 10 includes a second sealing portion 99 that is disposed above the first sealing portion 98 and that seals between the cover 91 and the connector covering portion 81. In other words, the second sealing portion 99 includes at least a portion of the cover 91 and at least a portion of the connector cover portion 81. The second sealing portion 99 is disposed above the first sealing portion 98 described later in the axial direction. In the present preferred embodiment, the second sealing portion has an annular or substantially annular shape. The second sealing portion extends in the circumferential direction along an underside of the cover 91 and an upper surface of the connector cover portion 81. A member such as an O-ring that can increase the sealability or an adhesive agent may be disposed between the cover 91 and the connector cover portion 81. A so-called labyrinth structure may be provided by the cover 91 and the connector cover portion 81, and both the labyrinth structure and another method such as an O-ring or an adhesive agent may be used. The second sealing portion 99 may preferably be formed by performing adhesion, pressure bonding, press-fitting, binding, welding, or the like on the cover 91 and the connector cover portion 81.

Connection of the external power supply to the connector portion 82 supplies a driving current to the substrate 35. The driving current is further supplied to the stator 24 from the substrate 35. By having a driving current flow through the coils of the stator 24, a magnetic field is generated. With the above, the rotor 21 including the shaft 22 rotates. The motor 10 generates rotation power in the above manner. The rotation sensor 61 detects a change in the magnetic field of the sensor magnet 60 rotating together with the shaft 22, and detects a rotation position of the rotor 21.

The upper cover portion 25*a* includes the upper bearing holding portion 34 and a first heat sink portion 86. The first heat sink portion 86 is a flat plate-shaped region. In the present preferred embodiment, the upper bearing holding portion 34 preferably has a cylindrical shape extending in the axial direction. In other words, the upper bearing holding portion 34 includes a through hole penetrating in the axial direction. The upper bearing holding portion 34 protrudes towards the lower side from a surface on a lower side of the upper cover portion 25*a*. In other words, an upper end portion of the upper bearing holding portion 34 is positioned below an underside of the first heat sink portion 86 in the axial direction. As illustrated in FIG. 4, the upper bearing 27*b* is fitted inside the upper bearing holding portion 34 in the radial direction. In other words, at least a portion of the upper bearing 27*b* is accommodated inside the through hole of the upper bearing holding portion 34. With the above, the upper bearing holding portion 34 holds the upper bearing 27*b*. Note that the upper bearing holding portion 34 preferably holds the upper bearing 27*b* by press-fitting, adhesion, or the like, for example. The upper bearing holding portion 34 is positioned below the sensor magnet 60. Furthermore, in the present preferred embodiment, the upper bearing holding portion 34 is, for example, together with the upper cover portion 25*a*, a single unitary member. However, the upper bearing holding portion 34 may be a member different from the upper cover portion 25*a*. In such a case, desirably, the upper bearing holding portion 34 is fixed to the upper cover portion 25*a* by press-fitting or by engagement.

The upper cover portion 25*a* includes the first heat sink portion 86 that is thicker than the portion of the tubular portion 24*a* holding the stator 24. Furthermore, in at least a portion in the tubular portion 24*a* that is above where the holding the stator 24 is held, the tubular portion 24*a* includes a second heat sink portion 87 that is thicker than the portion of the tubular portion 24*a* holding the stator 24. In other words, the upper cover portion 25*a* includes the first heat sink portion 86. The first heat sink portion 86 is a plate-shaped or substantially plate-shaped region. The thickness of the first heat sink portion 86 in the axial direction is thicker than the portion of the tubular portion 24a holding the stator 24. The tubular portion 24a includes the second heat sink portion 87. In the tubular portion 24a, the second heat sink portion 87 is positioned above the region where the stator 24 is held. At least a portion of an outer lateral surface of the second heat sink portion 87 is positioned outside in the radial direction with respect to an outer lateral surface of the region in the tubular portion 24a where the stator 24 is held. In the tubular portion 24a, the thickness of the second heat sink portion is thicker than the thickness of the region where the stator 24 is held.

The motor 10 includes the first sealing portion 98 that seals between the motor housing 25 and the connector covering portion 81. In the upper cover portion 25a, the first sealing portion 98 is disposed outside the first heat sink portion 86 in the radial direction. The first sealing portion 98 preferably includes at least a portion of the upper cover portion 25a and at least a portion of the connector cover portion 81. The first sealing portion 98 is positioned below the upper surface of the first heat sink portion 86. The upper cover portion 25a viewed in the axial direction preferably has an annular or substantially annular flat surface. The flat surface of the upper cover portion 25a surrounds the first heat sink portion 86 in the circumferential direction. The flat surface of the upper cover portion 25a is in contact with an underside of the connector cover portion 81. The flat surface of the upper cover portion 25a is connected to the underside of the connector cover portion 81 by adhesion, welding, deposition, press-fitting, binding, or the like. With the above, the first sealing portion 98 is provided between the upper cover portion 25a and the connector cover portion 81.

Note that a member such as an O-ring that has a high sealability or an adhesive may be disposed between the upper cover portion 25a and the connector cover portion 81 if so desired. A so-called labyrinth structure may be defined by the upper cover portion 25a and the connector cover portion 81, and both the labyrinth structure and another method such as an O-ring or an adhesive agent may be used.

As described above, in the present preferred embodiment, the first sealing portion 98 and the second sealing portion 99 are aligned in the axial direction. Both the first sealing portion 98 and the second sealing portion 99 extend in the circumferential direction. The first sealing portion 98 and the second sealing portion 99 are positioned outside an outer lateral surface of the tubular portion 24a in the radial direction. With the above, airtightness between the motor housing 25 and the connector 8 is improved and an increase in the size of the motor in the radial direction is significantly reduced or prevented. Furthermore, the first heat sink portion 86 is disposed above the upper bearing holding portion 34 in the axial direction. In other words, the first heat sink portion 86 does not overlap the upper bearing holding portion 34 in the radial direction.

While the specifics of the present preferred embodiment of the present invention has been described above, features of other preferred embodiments of the present invention are as follows.

The motor 10 including the motor body 20 that includes the rotor 21 including the shaft 22 extending in the axial direction about the central axis, the stator 24 including the rotor 21, the motor housing 25 that accommodates the stator 24 and the rotor 21, the cover 91 disposed above the motor body 20, the connector 8 including the connector covering portion 81 disposed between the motor body 20 and the cover 91, and the connector portion 82 is connectable to the external power supply, and the substrate 35 electrically connected to the motor body 20, being covered by the cover 91 or the connector 8 and being disposed on the upper side of the motor body 20, in which the connector covering portion 81 further includes the openings on the upper side and the lower side, in which, among the upper side and lower side openings, the opening on the upper side is closed by the cover 91, and the opening on the lower side is closed by the motor housing 25, in which the motor further includes the first sealing portion 98 that seals the upper portion of the motor housing 25 and the connector covering portion 81, and the second sealing portion 99 disposed on the upper side of the first sealing portion 98 and sealing between the cover 91 and the connector covering portion 81, and in which the first sealing portion 98 is disposed below the upper end of the motor housing 25. With the above configuration, in a structure including the first sealing portion and the second sealing portion 99 as well, the space accommodating the substrate 35 is able to be made smaller, and the overall motor is able to be miniaturized.

At least a portion of the substrate 35 is disposed at a position that overlaps the connector covering portion 81 in a radial direction. With the above configuration, since the bulging in the cover 91 to accommodate the substrate 35 is able to be made smaller, the assembled components of the overall motor overall are able to be miniaturized further.

The motor housing 25 includes the upper cover portion 25a disposed below the substrate 35, the tubular portion 24a that, below the upper cover portion 25a, holds the stator 24, and the lower cover portion 25b disposed below the tubular portion, in which the upper cover portion 25a includes, on an upper surface, the substrate fixing portions 85, and in which the substrate 35 is fixed with the substrate fixing portions 85. With the above configuration, since the substrate 35 is able to be directly fixed to a portion (the upper cover portion 25a) of the motor housing 25, the structure and configuration of the overall motor is able to miniaturized further.

By having the substrate fixing portions 85 protrude towards an upper side from the upper surface of the upper cover portion 25a, the upper cover portion 25a and the substrate 35 oppose each other in the axial direction with a gap in between. With the above configuration, even when the substrate 35 is directly fixed to the motor housing 25, the substrate 35 and the motor housing 25 can be insulated. More specifically, the portions other than the portion of the surface of the substrate 35 in which the metal wiring is disposed is contacted to the substrate fixing portions 85. Furthermore, while the substrate 35 and the upper cover portion 25a oppose each other with a gap in between, an insulation member with a high thermal conductivity may be disposed in the gap.

The connector portion 82 is disposed outside of the tubular portion 24a in the radial direction, and the substrate 35 is disposed above the upper cover portion 25a and above the connector portion 82. With the above configuration, compared with a case in which the connector portion is disposed above the substrate, the overall motor is able to be significantly reduced in size or miniaturized.

The connector 8 preferably is made of resin. With the above configuration, compared with a case in which the connector 8 is formed of a material other than resin, a lightweight motor is able to be manufactured inexpensively.

The upper cover portion 25a preferably includes the first heat sink portion 86 that is thicker than the portion of the tubular portion 24a holding the stator 24. In other words, the motor housing preferably is formed integrally with the heat radiating member. With the above configuration, the heat of the substrate 35 is able to be released to the motor housing. In particular, since the heat is able to be released to the motor housing, the efficiency of radiator is improved more than a case in which the heat sink and the motor housing are provided as different members.

At least a portion in the tubular portion 24a that is above where the holding the stator 24 is held includes the second heat sink portion 87 that is thicker than the portion of the tubular portion 24a holding the stator 24. With the above configuration, additional heat generated by the electronic component and by the wiring disposed on the substrate 35 is able to be released to the motor housing. In particular, as in the present preferred embodiment, in the structure in which the first sealing portion 98 and the second sealing portion 99 are bulged outwardly in the radial direction, the thickness is able to be increased outwardly in the radial direction from the tubular portion 24a without increasing the size of the overall motor in the radial direction. Furthermore, in the motor housing 25, since there is a space above the stator 24, the thickness is able to be increased inwardly in the radial direction from the tubular portion 24a without increasing the size of the overall motor in the radial direction.

The motor body 20 preferably further includes the bearing 27b that rotatably supports the rotor 21, and the sensor magnet 60 that is disposed above the shaft 22. The substrate 35 includes a rotation sensor 61 at a position opposing the sensor magnet 60 in the axial direction. The upper cover portion 25a can, with the bearing holding portion 34 that holds the bearing 27b, be located above the bearing holding portion 34, and the degradation of the bearing due to heat is able to be significantly reduced or prevented.

The detailed shapes of the members may be different from the shapes illustrated in the drawings of the present application. The elements described in the preferred embodiments and modifications described above may be combined appropriately within the range producing no contradictions.

Preferred embodiments of the present invention can be used, for example, in an on-board motor for an electric power steering device or the like, and in a motor for a household electric appliance.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A motor comprising:
a motor body that includes a rotor including a shaft extending in an up-down direction about a central axis, a stator including the rotor, and a motor housing that accommodates the stator and the rotor;
a cover disposed above the motor body;
a connector including a connector covering portion disposed between the motor body and the cover, and a connector portion connectable to an external power supply; and
a substrate electrically connected to the motor body, the substrate being covered by the cover or the connector and being disposed on an upper side of the motor body; wherein
the connector covering portion includes openings on an upper side and a lower side;
the opening on the upper side is closed by the cover;
the opening on the lower side is closed by the motor housing;
the motor further includes:
a first sealing portion that seals an upper portion of the motor housing and the connector covering portion; and
a second sealing portion disposed on an upper side of the first sealing portion, the second sealing portion sealing between the cover and the connector covering portion; wherein
the first sealing portion is disposed below an upper end of the motor housing.

2. The motor according to claim 1, wherein at least a portion of the substrate overlaps the connector covering portion in a radial direction.

3. The motor according to claim 1, wherein the motor housing includes:
an upper cover portion disposed below the substrate;
a tubular portion that holds the stator below the upper cover portion; and
a lower cover portion disposed below the tubular portion; wherein
the upper cover portion includes, on an upper surface, a substrate fixing portion; and
the substrate is fixed with the substrate fixing portion.

4. The motor according to claim 3, wherein
the substrate fixing portion protrudes towards an upper side from the upper surface of the upper cover portion; and
the upper cover portion and the substrate oppose each other in the axial direction with a gap in between.

5. The motor according to claim 1, wherein
the connector portion is disposed outside of a tubular portion in a radial direction; and
the substrate is disposed above an upper cover portion and above the connector portion.

6. The motor according to claim 1, wherein the connector is made of resin.

7. The motor according to claim 3, wherein the upper cover portion includes a first heat sink portion that is thicker than a portion of the tubular portion holding the stator.

8. The motor according to claim 7, wherein at least a portion above the portion of the tubular portion holding the stator includes a second heat sink portion that is thicker than the portion of the tubular portion holding the stator.

9. The motor according to claim 7, wherein the motor body further includes:
a bearing that rotatably supports the rotor;
a sensor magnet disposed at a portion above the shaft;
the substrate includes:
a rotation sensor that is disposed at a position that opposes the sensor magnet in the axial direction;
the upper cover portion includes:
a bearing holding portion that holds the bearing; and
a sensor magnet accommodating portion disposed above the bearing holding portion, the sensor magnet accommodating portion accommodating the sensor magnet; and
the bearing holding portion does not overlap the first heat sink portion in the radial direction.

* * * * *